United States Patent
Persson et al.

(10) Patent No.: US 6,914,947 B2
(45) Date of Patent: Jul. 5, 2005

(54) METHOD AND APPARATUS FOR HANDLING TIME-DRIFT

(75) Inventors: Joakim Persson, Lund (SE); Leif Wilhelmsson, Dalby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 777 days.

(21) Appl. No.: 09/795,934

(22) Filed: Feb. 28, 2001

(65) Prior Publication Data

US 2002/0118775 A1 Aug. 29, 2002

(51) Int. Cl.$^7$ ............................................. H04L 27/06
(52) U.S. Cl. ...................... 375/340; 714/775; 375/365
(58) Field of Search ................................ 370/503, 510, 370/512, 509, 513, 514, 516; 714/780, 786, 789, 774, 775, 776, 758; 375/325, 326, 341, 342, 340, 355, 365, 366

(56) References Cited

U.S. PATENT DOCUMENTS

| | | | |
|---|---|---|---|
| 4,715,029 A | | 12/1987 | Crookshanks ................. 370/70 |
| 5,222,189 A | | 6/1993 | Fielder ........................... 395/2 |
| 5,241,545 A | * | 8/1993 | Kazecki et al. .............. 370/337 |
| 5,259,005 A | * | 11/1993 | LaRosa et al. ............... 375/355 |
| 5,715,278 A | | 2/1998 | Croft et al. ................... 375/224 |
| 5,754,605 A | | 5/1998 | Chong et al. ................ 375/368 |
| 5,896,391 A | * | 4/1999 | Solheim et al. ............. 714/704 |
| 5,991,346 A | * | 11/1999 | Lu .............................. 375/355 |
| 6,104,769 A | * | 8/2000 | Rainish ....................... 375/355 |
| 6,188,737 B1 | * | 2/2001 | Bruce et al. ................. 375/355 |
| 6,331,976 B1 | * | 12/2001 | Sriram ......................... 370/350 |
| 6,519,302 B1 | * | 2/2003 | Bruce et al. ................. 375/355 |
| 6,587,500 B1 | * | 7/2003 | Persson et al. .............. 375/142 |
| 6,757,870 B1 | * | 6/2004 | Stinger ........................ 715/513 |

FOREIGN PATENT DOCUMENTS

| | | | |
|---|---|---|---|
| EP | 0 673 167 A2 | 9/1995 | ............ H04N/7/24 |
| GB | 2 101 851 A | 1/1983 | |

OTHER PUBLICATIONS

Standard Search Report as performed on Aug. 21, 2001, by European Patent Office Examiner T. Pieper.
Kalogiros et al., "A Theoretical Model for Time Code Modulation", *IEEE*, 1999, pp. 2439–2442.

* cited by examiner

*Primary Examiner*—Tesfaldet Bocure
*Assistant Examiner*—Khanh Tran
(74) *Attorney, Agent, or Firm*—Jenkens & Gilchrist, P.C.

(57) ABSTRACT

A method for maintaining synchronization between a transmitter and a receiver is disclosed. The method offsets time drift which causes a degradation in the quality of communication between a transmitter and a receiver. The method comprises using a first sampling time to obtain a first sequence of hard decision symbols for decoding contents of a portion of a received packet, switching to a second sampling time upon degradation in a reliability of the symbols, and using the second sampling time to obtain a second sequence of hard decision symbols for decoding contents of a remaining portion of the received packet.

17 Claims, 2 Drawing Sheets

METHOD AND APPARATUS FOR HANDLING TIME-DRIFT

FIELD OF THE INVENTION

This invention relates to digital communication and more particularly, to a method of maintaining synchronization between a transmitter and a receiver.

BACKGROUND OF THE INVENTION

An essential element in digital communications is synchronization between a transmitter and a receiver. Time synchronization has to be acquired and tracked between the transmitter and the receiver. In order to acquire time synchronization, a sync word having desirable auto-correlation properties is typically used. A Barker sequence or a maximum length linear shift register sequence are examples of this type of a sync word. The sampling time, relative to the transmitted symbol, may or may not need to be updated depending on various factors. These factors include the transmitter and receiver clock accuracy, the length of the data packets transmitted and the sampling time resolution. The procedure of updating the sampling time is referred to as tracking.

The transmitter and receiver accuracy may be designated as A parts per million (PPM), the packet duration may be designated as $T_{packet}$, and the symbol duration may be designated as $T_S$. Based on system specification defined by the communication system operator or on specific applications, a determination may be made as to whether tracking is needed. For example, if a time-drift in the sampling time during the entire packet corresponding to $(0.1*T_S)$ is acceptable, tracking is not needed if $(2* AT_{Packet}) \leq 0.1*T_S$. Since $T_{Packet}=NT_S$ where N is the number of symbols, the maximum number of symbols $N_{max}$ is:

$$N_{max}=(0.1)/(2*A) \quad (1)$$

If both the transmitter and receiver clocks have an accuracy of 20 ppm, the maximum number of symbols, $N_{max}$, in a packet becomes $0.1/(2*20*10^{-6})=2500$.

The sampling time resolution is another factor which determines whether the sampling time needs to be updated. Typically, the incoming signal is sampled by the receiver at a rate that is higher than the symbol rate. That is, the received signal is over sampled, at least during the reception of the sync word. The over sampling ratio (OSR) may be designated as $N_{OSR}$ where $N_{OSR}$ is the number of samples per symbol. By correlating the received sequence with the sync word, the receiver can estimate which one of the $N_{OSR}$ sample phases is the best one to use as the sampling time throughout the remaining part of the packet. Assuming that the best possible sample is chosen and that the samples are equidistant, then the chosen sampling time cannot vary more than $T_S/(2*N_{OSR})$ from the optimum sampling time. Suppose the sampling instant that is used must be less than or equal to a variable $\Delta t$ (where $\Delta t$ varies according to system requirements) from the optimum sampling time, this cannot be guaranteed unless $$Ts/(2*N_{OSR})+2ATsN \leq \Delta t, \quad (2)$$

where N is the packet length (expressed as a number of symbols). Referring to (2), the packet length may be increased by increasing the OSR. However, even if the OSR is made arbitrarily large, the maximum packet length cannot exceed $$N=(\Delta t/T_S)/(2*A) \quad (3)$$

It is highly desirable to increase the packet length in order to decrease overhead during transmission and increase user data rate.

SUMMARY OF THE INVENTION

Accordingly, an object of the present invention is to maintain synchronization between a transmitter and a receiver.

Another object of the present invention is to facilitate an increase in a packet length by selecting alternative sampling times when an originally selected sampling time is no longer the optimum choice throughout an entire packet.

These and other objects are achieved by exemplary methods of the present invention according to which a maximum allowable packet length is increased by using the sync word to identify sampling time(s) additional to an originally selected sampling time. A sampling time is obtained at the start of a transmitted data packet by using a sync word. This sampling time is used to obtain a sequence of hard decision symbols which are base band processed. Time drift causes degradation in reliability of symbols in a sequence. As a result, a sampling time that was chosen originally may not be the best choice. When this occurs, a next best sampling time which may be neighboring or closest to the originally selected sampling time may be used. In this manner, the samples at the end of a packet can be depended on to be as reliable as those at the start of the packet.

An algorithm according to exemplary embodiments of the present invention does not assume that there is any form of training bits available within the packet for updating the choice of sampling time as that would reduce the throughput of the system. Instead, a plurality of sampling times are used throughout the entire packet, and the decision concerning which sampling times are to be used for decoding during different parts of a packet is determined by employing a cyclic redundancy check (CRC) code at the end of the reception of a packet.

A method for adapting a sampling instant during the reception of a packet is disclosed. A complete packet is decoded using more than one sampling phase, and the CRC is used to determine if and when an alternate sampling time is to be chosen. If only two possible sampling phases are to be used, a simple decision rule may be employed since the originally chosen sampling phase does not result in an acceptable CRC value. The unacceptable CRC typically indicates a degradation in the reliability of the symbols later in the packet symbol and for the alternative sampling phase, the opposite is true (i.e., degradation occurs earlier in the packet). This indicates that there is an instant of time where the originally used sampling phase should be replaced by an alternative one. Base band processing is performed on a sequence of hard decision symbols where the sampling time used to obtain these hard decision symbols is obtained at the start of the data packet by using a sync word.

BRIEF DESCRIPTION OF THE DRAWINGS

The above objects and features of the present invention will be more apparent from the following description of the preferred embodiments with reference to the accompanying drawings, wherein.

DETAILED DESCRIPTION OF THE INVENTION

In the following description, for purposes of explanation and not limitation, specific details are set forth, such as particular techniques, etc. in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as not to obscure the description of the present invention.

Embodiments of the present invention are described below by utilizing an example. Then, generalizations of the example are discussed.

Figure 1:
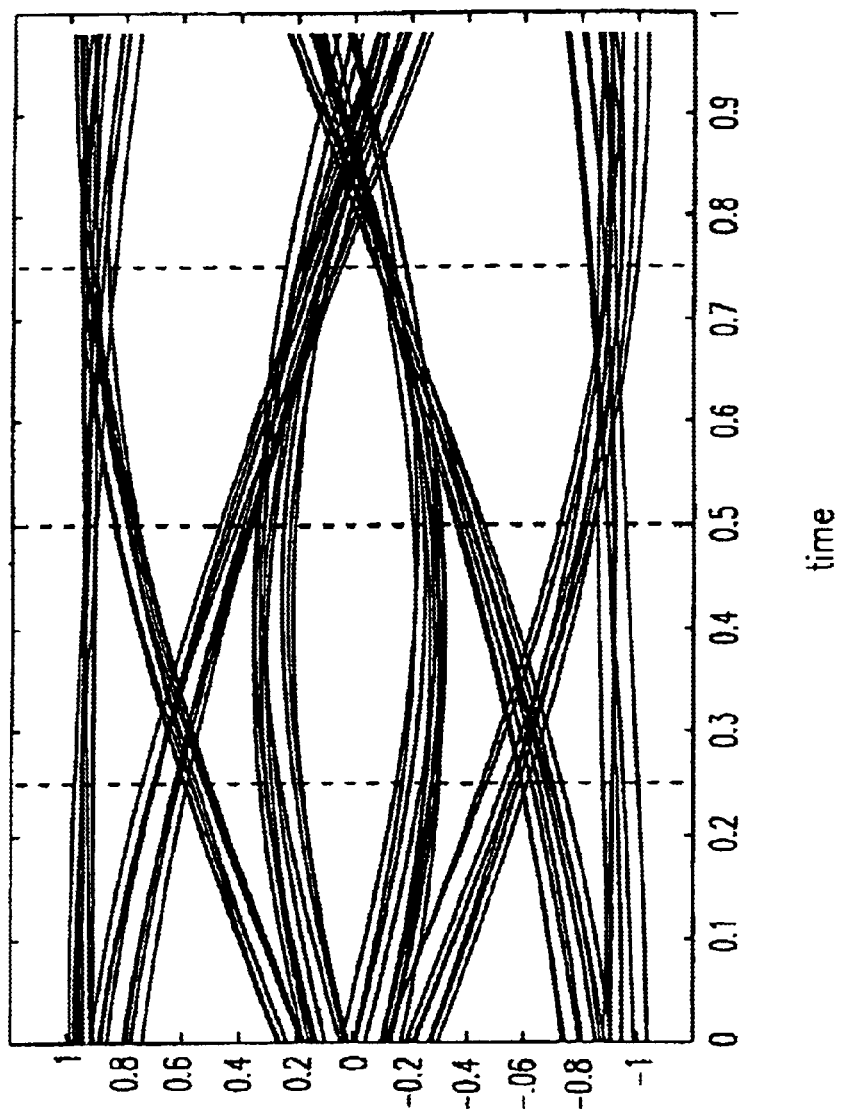
FIG. 1 illustrates an eye pattern at the output of a radio with a plurality of possible sampling times at the start of a data packet.

With an OSR of 4, a symbol stream is sampled four times per sample. The samples are assumed to be equidistant (spaced apart equally) and it is further assumed that an algorithm for determining the best sampling time is employed. Referring to FIG. 1, which illustrates an eye pattern at the output of a radio together with the possible sampling times at the start of the packet, the best sample is the one that is located as close as possible to the middle of the eye. In this figure, the x-axis corresponds to the duration of one symbol, $T_S$, and the possible sampling times may be at 0, 0.25, 0.50 and 0.75 $T_S$ (equally spaced). The best sample is the one near 0.50 (the sample at 0.45 is more accurate but 0.5 is the closest sampling time), and without updating, this may be the one that is to be used throughout the packet.

Figure 2:
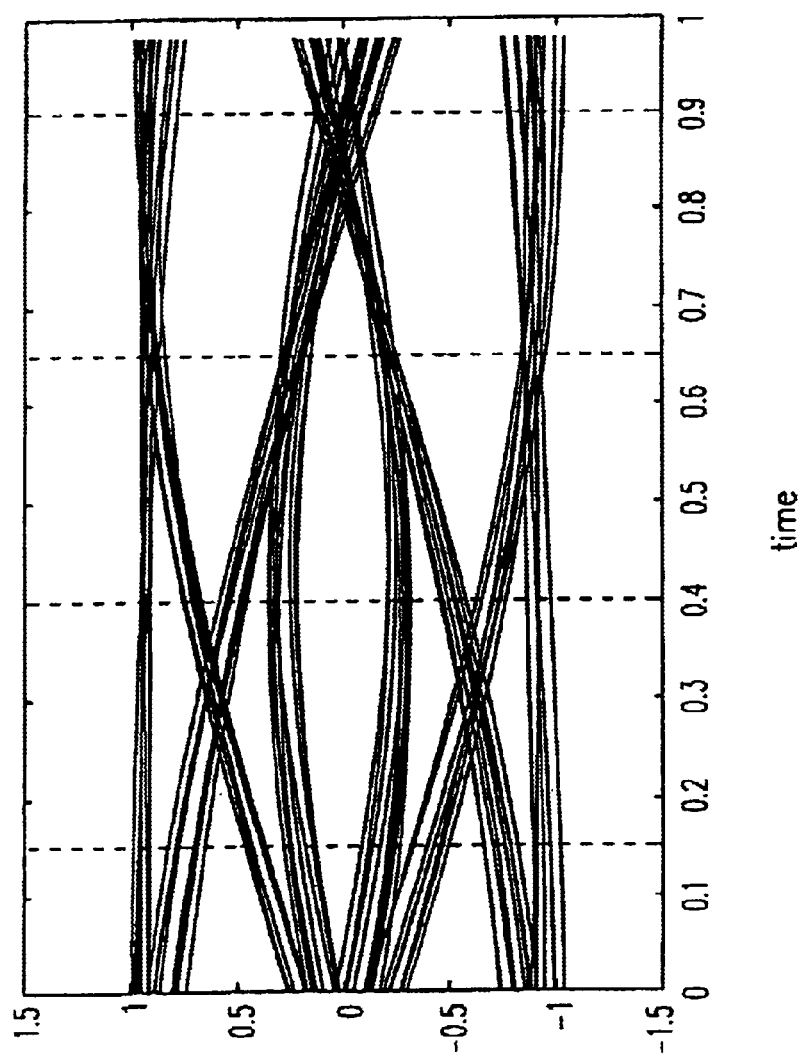
FIG. 2 illustrates the eye pattern of FIG. 1 with a time delay.

Due to time drift, the samples are typically delayed relative to the eye pattern. More precisely, for an example, assume that at the end of the packet the delay corresponds to a shift right by 0.15 $T_S$. The corresponding eye pattern and the sampling times are depicted in FIG. 2 (i.e., at 0.15, 0.4, 0.65 and 0.9). As seen, the sampling time which was optimal at the start of the packet has now moved to 0.65 $T_S$, and is no longer optimal. Instead, the sample that at the start of the packet was at 0.25 $T_S$, is now located at 0.40 $T_S$ and is clearly the sampling time that should be used.

Referring to FIGS. 1 and 2, it would be desirable to change from one of the four possible sampling phases (the one that was at 0.50 $T_S$ at the start of the packet) to another sampling phase (the one that is at 0.40 $T_S$ at the end of the packet). Furthermore, it should be noted that both of the discussed choices of sampling times above will, for a sufficient signal-to-noise-ratio (SNR)(based on what is required by specific applications), result in correct decisions, if the decision threshold is correctly chosen to be zero. A correct decision will result in a transmitted '0' being decoded as a '0' and a transmitted '1' being decoded as a '1' in the receiver. The difference is that in a noisy situation, the better of the two sampling phases will have an improved noise margin (the distance from the eye opening to the decision threshold). Under SNRs of interest, a reasonable bit error rate (BER) may, for example, be 0.01% for the best choice of sampling time and 0.1% for the second best choice. One can therefore anticipate that the decoded sequences corresponding to the two different sampling times will be the same in all but at most a few positions. To illustrate this further, let $$Y_1 = y_{11}, y_{12}, \ldots, y_{1N} \quad (4)$$

$$Y_2 = y_{21}, y_{22}, \ldots, y_{2N} \quad (5)$$

be the two decoded sequences corresponding to the two choices of sampling instants mentioned above. Also, assume that N=2000 and the sequences differ in the three positions n=N−17, n=N −83, and n=N−145. The decoding procedure would then be as follows:

The CRC is used to check if $Y_1$ is a valid code word (i.e., if the CRC checks in the receiver, the code word is assumed to be correct). A valid code word is a sequence of channel symbols that may be generated by the transmitter according to a coding scheme being used. If $Y_1$ is a valid code word, it is accepted and the decoding is considered to have been completed. If we assume that if there is a difference between $Y_1$ and $Y_2$, the symbol in $Y_1$ is correct provided that an index, n, of the symbol is less than or equal to $n_{change}$, and that the symbol in $Y_2$ is correct otherwise. A correct symbol implies that the receiver determines that the received symbol is the one that was actually transmitted. A symbol indexed as a 'n' means that the symbol is the $n^{th}$ symbol transmitted in a sequence. Due to time drift, a receiver's best option is to choose the first $n_{change}$ symbols from sequence $Y_1$ and, thereafter, to choose symbols from sequence $Y_2$ in order to reduce error. For instance, $n_{change}$=1000 may be assumed which corresponds to the middle of the packet. The sequence checked by the CRC would then be $Y_1$ but with position n=N−17, n =N−83, and n=N−145 of $Y_1$ being replaced with the corresponding symbol in $Y_2$. If the CRC checks as being correct (i.e., the receiver computes the CRC according to what data stream it has decoded and compares it to the CRC received from the transmitter along with the data), the code word is accepted and decoding is completed. If no code word is found such that the CRC checks, then a retransmission is requested.

In practical and real situations, it is quite common to have a long block where all the symbols are identical. Referring again to FIGS. 1 and 2 depicting the eye pattern and the possible sampling times at the start and at the end of the packet, it should be clear that if the drift is continuous, then there will be a block located "in the middle" of the packet where the two sampling times are essentially equally adequate or good. In the first part of the packet, the sampling time that was best (i.e., no degradation due to sampling at a bad time instant) at the beginning of the packet can be anticipated to be the best one. If, however, there is discrepancy between $Y_1$ and $Y_2$ at the end of the packet and it is known that there are errors since the CRC does not check, then another sampling time may be used.

Certain generalizations may be made in the case of two sequences corresponding to two different sampling times. It is not advisable to use a fixed value of $n_{change}$, but, instead, to identify a position where the sequences differ and then assume that the second one is correct from this symbol to the end of the packet. All the symbols where $Y_1$ and $Y_2$ differ are identified and then different values of $n_{change}$ may be tried such that the first sequence is assumed correct for all indexes, n smaller than or equal to $n_{change}$, and the second sequence is assumed correct for all indexes greater than $n_{change}$. This means that if there are $n_e$ positions where the two sequences differ with $n_e$ being greater than 0, then a total of $n_e+2$ different sequences need to be checked. The value $n_{change}$ represents a first position where the sequences differ and $n_e$ represents the number of positions where the sequences differ.

A method according to exemplary embodiments of the present invention may be more easily illustrated with the following example. In this example, assume that two decoded sequences $Y_1$ and $Y_2$, each ten symbols in length, differ in positions five and eight. The sequences are $Y_1$=0 0 0 0 0 0 0 0 0 0 and $Y_2$=0 0 0 0 1 0 0 1 0 0. Therefore, N=10, k=2, $n_1$=5 and $n_2$=8. The first sequence $Y_1$ is tested using the CRC code. If the CRC code checks for $Y_1$, then $Y_1$ is considered reliable and is used. If the CRC code does not check on the other hand, a new sequence $Y_1$ is created. $Y_1$ includes the first four symbols from $Y_1$ and the next six symbols from $Y_2$. The switch from the first sequence to the second sequence is made at the first instant where the two sequences differ (i.e., at the fifth position). Therefore, $Y_1$=0 0 0 0 1 0 0 1 0 0. This new sequence is tested using the CRC code. If the code checks, the sequence $Y_1$ (which in this case is identical to $Y_2$) is used. If $Y_1$ does not check, another new sequence $Y_1$ is created which is made up of the first seven symbols from $Y_1$ and the next three symbols from $Y_2$. The switch from $Y_1$ to $Y_2$ in this case is made at the second instant (i.e., at the eighth position) where the two sequences differ. Therefore, the new $Y_1$=0 0 0 0 0 0 0 1 0 0. The CRC code is checked for the new $Y_1$. If the code checks, the new sequence $Y_1$ is used. If the code does not check, $Y_1$ is compared with $Y_2$ to determine whether $Y_1$=$Y_2$. In this example, the first $Y_1$=$Y_2$. If the CRC does not check for any of the sequences described herein, a retransmission of the sequences is requested. Pseudo code for practicing the exemplary method described herein is listed in the attached Appendix I.

Algorithms according to exemplary methods of the present invention may be practiced utilizing existing systems. A receiver may be modified or programmed to perform the method of the two sequence example described.

Exemplary methods of the present invention may also be applied to more than two sampling times. However, it should be noted that, in order for the algorithm to be simple enough, the sample times used should result in sequences without too many errors. Sequences with more errors result in a more complex algorithm. In addition, if a high OSR (such as an OSR>6, for example) is used, non consecutive phases may be sampled. A large time drift implies that an optimal sampling phase (i.e., time instant) varies rapidly. The difference in performance when choosing the phase next to the optimal is less than if the OSR is smaller. Checking samples at non-consecutive phases may be viewed as down sampling a received sequence. This would allow for a larger time-drift to be handled without the need for many sequences.

If several sequences corresponding to several different sampling times are used, then the following exemplary method may be utilized. If all sequences do not have the same symbol in one position, then the decision of which sample phase is to be used becomes more complex than when only two sequences are used. The receiver may determine which symbol (i.e., which of the sequences) is most reliable by making use of soft information from the demodulator. The soft information is effectively a measure of the reliability of that symbol. Alternatively, the receiver may make a majority decision based on all the available sequences. For example, if three sequences (i.e., sampling sequences) are available and the decoded value of a particular position is '1' in two of the sequences and '0' in one sequence, then the majority decision rule dictates that the decision has to be a '1'. If an instant of time corresponding to $n_{change}$ is used in the description above, there may be a plurality of such instants. More precisely, this plurality corresponds to the number of used sampling times minus one. The complexity of the algorithm in this case will be much higher. The complexity will grow linearly with the number of sequences and also depend on the type of symbol decision algorithm (majority or soft) that is used.

A description of how the different sampling phases are chosen is not included as the algorithm according to exemplary embodiments of the present invention is not dependent on how this choice (i.e., of majority or soft symbol decision algorithm) is made and is known to one of ordinary skill in the art, even though the quality of the decoded sequence might be dependant on the choice. Exemplary methods of the present invention may be summarized as follows:

Different sampling phases of the received signal are correlated with a known sync word. When one or more of the sampling phases result in a predetermined threshold being exceeded, the sync word is considered as being present. The sync word precedes the actual information and facilitates detection of the start of transmission at the receiving end. In principle, the threshold is the required correlation between the known sync word and the information demodulated in the receiver (i.e., noise or signal). Next, the best sampling phase is determined using conventional methods for synchronization. When the correlation value as described above peaks, the receiver knows which sampling phase to use. The additional sampling times that are to be used are determined. If only one additional sampling phase is to be used, the best of two adjacent sampling phases (typically the one resulting in the best correlation with the known sync word) would be used. If more than one additional sampling phase is necessary, then the sampling phases to be used may be determined by comparing their respective correlation values from each of the sampling phases that is to be used.

The receiver then adopts the sample phase that is to be used compensating for possible time drift during the reception of the entire packet using the methods described above.

The foregoing has described the principles, preferred embodiments and modes of operation of the present invention. However, the invention should not be construed as being limited to the particular embodiments described above. The above-described embodiments should be regarded as illustrative rather than restrictive, and it should be appreciated that variations may be made in those embodiments by those skilled in the art without departing from the scope of the present invention as defined by the following claims.

What is claimed is:

1. A method of handling time drift during packet reception, said method comprising the steps of:

using a first sampling time to obtain a first sequence of hard decision symbols for decoding contents of a first portion of said received packet;

determining if a degradation in a reliability of the first sequence of hard decision symbols has occurred using an error checking code;

wherein the determining step is performed response to an end of a reception of the packet;

switching to a second sampling time if degradation in the reliability of the first sequence of symbols has been determined; and responsive to switching to said second sampling time, using said second sampling time to obtain a second sequence of hard decision symbols for decoding contents of a second portion of said received packet.

2. The method of claim 1, wherein said second sequence is more reliable than said first sequence for decoding said second portion of the packet.

3. The method of claim 1, wherein a sync word is used to select said first and second sampling times.

4. The method of claim 1, wherein a determination of a particular sampling time is made by using the error checking code.

5. The method of claim 4, wherein the error checking code is a cyclic redundancy check (CRC) code.

6. The method of claim 5, wherein said degradation is indicated by the CRC code not checking for the first sampling time.

7. The method of claim 1, wherein said degradation is indicated by a difference between corresponding symbols of said first and second sequences at one sampling instant.

8. The method of claim 4, wherein the determination of the particular sampling time is performed responsive to an end of the reception of the packet.

9. The method of claim 5, wherein if said CRC results in lack of a valid code word, a retransmission is requested.

10. The method of claim 1, wherein said degradation results from time drift.

11. The method of claim 1, wherein said decision symbols are subject to baseband processing.

12. The method of claim 1, wherein an adequacy of a selected sampling time is determined by evaluating a signal to noise ratio.

13. The method of claim 1, wherein a plurality of sampling times are used throughout said packet.

14. The method of claim 1, wherein said first sampling time is used at the beginning of a packet.

15. The method of claim 1, wherein said first sequence of hard decision symbols are obtained by correlating received signals with a known sync word.

16. A method of handling time drift during packet reception, said method comprising the steps of:

using a first sampling time to obtain a first sequence of hard decision symbols for decoding contents of a first portion of said received packet;

determining if a degradation in a reliability of the first sequence of hard decision symbols has occurred using an error checking code;

wherein the determining step is performed responsive to at an end of a reception of the packet;

switching to a second sampling time if degradation in the reliability of the first sequence of symbols has been determined;

responsive to switching to said second sampling time, using said second sampling time to obtain a second sequence of hard decision symbols for decoding contents of a second portion of said received packet;

determining if a degradation in a reliability of the second sequence of hard decision symbols has occurred using the error checking code;

wherein the determining step is performed responsive to the end of the reception of the packet;

switching to a third sampling time if degradation in the reliability of the second sequence of symbols has been determined; and responsive to switching to said third sampling time, using said third sampling time to obtain a third sequence of hard decision symbols for decoding contents of a third portion of said received packet.

17. The method of claim 16, wherein said third sequence is more reliable than said first sequence for decoding contents of the third portion of the packet.

* * * * *

UNITED STATES PATENT AND TRADEMARK OFFICE
CERTIFICATE OF CORRECTION

PATENT NO. : 6,914,947 B2
DATED : July 5, 2005
INVENTOR(S) : Joakim Persson and Leif Wilhelmsson It is certified that error appears in the above-identified patent and that said Letters Patent is hereby corrected as shown below:

Column 5,
Lines 10, 14, 16, 17, 18, 22, 23, 24, 25 and 26, replace "$Y_1$" with -- $Y_i$ --.

Signed and Sealed this

First Day of November, 2005

JON W. DUDAS
*Director of the United States Patent and Trademark Office*